United States Patent [19]
Honig et al.

[11] Patent Number: 5,681,807
[45] Date of Patent: Oct. 28, 1997

[54] COATED ALKALI METAL PEROXY SALTS AND PROCESS FOR THEIR PREPARATION

[75] Inventors: Helmut Honig, Geretsried; Werner Doetsch; Manfred Mathes, both of Bad Hoenningen; Klaus-Guenter Gerling, Laatzen; Gerd Hecken, Vettelschoss, all of Germany

[73] Assignee: Solvay Interox GmbH, Hanover, Germany

[21] Appl. No.: 676,132

[22] PCT Filed: Dec. 17, 1994

[86] PCT No.: PCT/EP94/04207

§ 371 Date: Oct. 1, 1996

§ 102(e) Date: Oct. 1, 1996

[87] PCT Pub. No.: WO95/18064

PCT Pub. Date: Jul. 6, 1995

[30] Foreign Application Priority Data

Dec. 29, 1993 [DE] Germany .......................... 43 44 831.3
Oct. 7, 1994 [DE] Germany .......................... 44 35 817.2

[51] Int. Cl.$^6$ .................. C01B 15/10; C11D 3/39; C11D 17/00

[52] U.S. Cl. ............... 510/375; 252/186.25; 252/186.27; 252/186.29; 252/186.32

[58] Field of Search ................... 252/186.25, 186.27, 252/186.29, 186.32; 510/375

[56] References Cited

U.S. PATENT DOCUMENTS 5,069,808 12/1991 Gerling et al. ............... 202/99

FOREIGN PATENT DOCUMENTS

| 395 970 | 11/1990 | European Pat. Off. . |
| 407 189 | 1/1991 | European Pat. Off. . |
| 546 815 | 6/1993 | European Pat. Off. . |
| WO 92/17400 | 10/1992 | WIPO . |

*Primary Examiner*—Margaret Einsmann
*Attorney, Agent, or Firm*—Evenson, McKeown, Edwards & Lenahan P.L.L.C.

[57] ABSTRACT

The use of lactobionic acid, lactobionic acid salts and/or lactobionic acid derivatives as covering material is disclosed for coating alkali metal peroxy salts, in particular for coating sodium percarbonate. In an advantageous alternative of the invention, alkali metal peroxy salts are provided with a covering layer that contains as covering materials lactobionic acid and/or lactobionic acid salt mixed with boric acid and/or a boric acid salt as additional covering material. This coating stabilizes the alkali metal peroxy salts and protects them against humidity and decomposition. In another advantageous alternative, lactobionic acid, lactobionic acid salts and/or lactobionic acid derivatives are used in combination with or in particular mixed with an inorganic mineral salt mixture of alkali metal sulphate and alkali metal chloride as additional covering material for coating alkali metal peroxy salts, in particular for coating sodium percarbonate. The invention is preferably used for coating and stabilizing sodium percarbonate.

24 Claims, No Drawings

COATED ALKALI METAL PEROXY SALTS AND PROCESS FOR THEIR PREPARATION

The invention relates to the use of lactobionic acid, lactobionic acid salts and/or lactobionic acid derivatives as a coating material for coating particulate alkali metal peroxy salts, a process for the preparation of coated particulate alkali metal peroxy salts in which lactobionic acid, a lactobionic acid salt and/or a lactobionic acid derivative are used as coating material for coating the alkali metal peroxy salt particles and, additionally, the coated, particulate alkali metal peroxy salts obtained according to the preceding process and their application.

It is well known that peroxy compounds can be used as bleaching compounds in detergent mixtures in powder form. In the usual heavy duty detergents for household use, sodium perborate tetrahydrate or sodium perborate monohydrate are usually used as bleaching agents since these materials are relatively resistant to decomposition in a pure detergent medium. However, use is made of other alkali metal peroxy salts, in particular peroxycarbonate (percarbonate) with increasing frequency. These alkali metal peroxy salts, percarbonate in particular, are stable in the pure dry state; however, they have the disadvantage of decomposing easily in the presence of moisture with loss of active oxygen; this will be illustrated in further detail below by way of the example of percarbonate, particularly sodium percarbonate (PCS).

The above disadvantages are attributable in particular to the fact that percarbonate can never be entirely dry since, apart from the residual water from the production process, water is always formed by decomposition of hydrogen peroxide in the PCS itself. During the preparation of PCS from solutions (wet process), it must also be remembered that, instead of a well defined, homogenous compound, a mixture of compounds, some of them containing water of hydration, with the following formula are obtained:

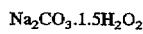

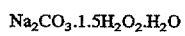

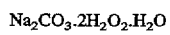

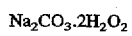

The moisture which is harmful for the stability of PCS therefore originates not only from the base powder by way of which a major part of the moisture is introduced into the detergent composition via the individual components such as zeolite, carboxymethylcellulose, soda, optical brighteners etc. but a percentage of the undesirable moisture consequently originates from the percarbonate itself. For this reason, an optimum coating layer for alkali metal peroxy salts, in particular for percarbonate, ought to keep off not only the moisture affecting the percarbonate particle from outside, but it ought to simultaneously be capable of sufficiently protecting the percarbonate against the water of crystallization formed from the percarbonate itself and/or the moisture of decomposition. In addition, the coating material used for coating the PCS particles ought not to impede the rate of dissolution of the percarbonate. Apart from their protective and coating function, the coating materials used should be able to accomplish additional tasks in ready-to-use composition containing the coated alkali metal peroxy salt.

To stabilize alkali metal peroxy salts, it had previously been suggested according to the state of the art to coat alkali metal peroxy salts, e.g. with inorganic stabilizing materials or mineral protective films.

German Offenlegungsschriften 33 21 082 and 33 48 394, for example, describe the use of borate which may additionally contain an alkali metal silicate as coating agent for coating percarbonate. A similar coating material of different boric acids, if necessary again containing alkali metal silicate, is described in German Offenlegungsschrift 28 00 916. Mineral salts are also recommended as coating materials according to the state of the art. German Offenlegungsschrift 29 15 980, for example, describes coating of sodium percarbonate with alkaline earth metal salts which are applied onto the sodium percarbonate particles from an aqueous solution. Moreover, German patents 24 17 572 and 26 22 610 describe the stabilization of alkali metal peroxy salts by coating with a mineral protective film of sodium carbonate with other mineral salts, in particular with sodium sulphate. According to German patent 26 22 610, this mineral coating layer may additionally contain sodium silicate.

Although the above-mentioned inorganic or mineral coating materials according to the state of the art provide an improvement in the stability of alkali metal peroxy salts, the existing problems, particularly as regards sodium percarbonate, are not yet solved in the desired way by the coating materials suggested according to the state of the art.

Consequently, the task consisted of finding a new coating material for particulate peroxy compounds, which coating material satisfies the requirements detailed above as far as possible and by means of which the particles coated with it can be provided with a better stability during storage in the presence of other detergent components.

The task is achieved by means of the particulate alkali metal peroxy salt defined in the claims, which is coated with a coating layer containing organic coating material. In addition, the task is achieved by means of the process for the preparation of the particulate alkali metal peroxy salts coated according to the invention and the application indicated.

In particular, the invention suggests the use of lactobionic acid, lactobionic acid salts and/or lactobionic acid derivatives as coating material for coating alkali metal peroxy salts such as in particular those from the group of peroxycarbonate, peroxypyrophosphate, peroxytripolyphosphate and/or peroxymonosulphate; apart from the peroxy salts mentioned above, other persalts known according to the state of the art, perborates, inorganic peroxides, etc. can be considered in connection with the application according to the invention. Preferably, however, the use of lactobionic acid derivatives is suggested for coating sodium percarbonate. According to a variation of the invention, the use is suggested of lactobionic acid and/or lactobionic acid salt in combination, preferably in mixture, with boric acid and/or boric acid salt for coating alkali metal peroxy salts, preferably sodium percarbonate.

According to a further variation of the invention the use is suggested of lactobionic acid, lactobionic acid salts and/or lactobionic acid derivatives as coating material in combination, preferably in mixture, with a mineral salt mixture of alkali metal sulphate and alkali metal chloride as further coating material for coating alkali metal peroxy salts, preferably sodium percarbonate.

Lactobionic acid is 4-(beta-D-glactosido)-D-gluconic acid and known as such. It can be obtained by the oxidation of lactose, for example. Salts of lactobionic acid in this connection are water-soluble salts with cations from the group of alkali and alkaline earth metals, preferably the alkali metals. Calcium is a suitable alkaline earth metal. Preferred lactobionic acid salts are in particular the sodium and potassium lactobionates which form no hardness salts. Lactobionic acid derivatives according to the meaning of the invention are e.g. lactobionic acid amides on lactobionic acid esters. Lactobionic acid amides are those amides of lactobionic acid with unbranched, saturated or unsaturated, primary alkyl amines with up to 22 C atoms. Fatty acid amides of lactobionic acid, whose amine radicals have 8 to 22 C atoms in the straight chain are appropriate, for example. Amides from amines with chain lengths of 14 to 18 C atoms, which may also be present in mixture, are preferred, such as a fatty acid amine mixture obtained from a naturally occurring fatty acid mixture. Lactobionic acid esters are those esters of lactobionic acid with unbranched, unbranched, saturated or unsaturated primary alkanols with up to 22 C atoms. Lactobionic acid esters in the form of straight chains formed with primary alkanols with 8 to 22 C atoms, for example, are appropriate, these alkanols being derived from the corresponding fatty acids by reduction. Examples of the fatty acids on which the lactobionic acid amides or esters are based are caprylic acid, caprinic acid, lauric acid, myristic acid, palmitic acid stearic acid, arachic acid and behenic acid; examples of unsaturated fatty acids are palmitolenic, oleic, linoleic and linolenic acid; naturally occurring fatty acid mixtures are e.g. coconut fatty acid and tallow fatty acid. The lactobionic acid amides and esters are well known and commercially available; they can also be obtained by amidation or esterification of lactobionic acid according to known methods. Lactobionic acid and its salts have already been described for detergent and cleaning agent compositions, on the strength of their builder and co-builder properties. The use as coating material for coating persalts, however, is new, particularly in combination with boric acid or boric acid salt, respectively, or in combination with the mineral salt mixture consisting of alkali metal sulphate and alkali metal chloride (hereinafter called alkali metal sulphate chloride).

The particulate alkali metal peroxy salt coated according to the invention consists of a core which consists essentially of an alkali metal peroxy salt, in particular from the group of peroxycarbonate (percarbonate), peroxypyrophosphate, peroxytripolyphosphate and/or peroxymonosulphate and a coating layer surrounding the core which contains, as coating material, an essential proportion of lactobionic acid, lactobionic acid salt and/or a lactobionic acid derivative; optionally, the coating layer can additionally contain a certain proportion of other common coating materials and/or auxiliary agents commonly used in the preparation of alkali metal peroxy salts. A preferred particulate alkali metal peroxy salt coated according to the invention is peroxycarbonate, particularly sodium percarbonate.

According to an appropriate variation of the invention, the coated particulate alkali metal peroxy salt is characterized in that the coating layer contains lactobionic acid, a lactobionic acid salt and/or a lactobionic acid derivative in a total amount of at least 50% by weight (based on the coating layer). Preferably, the amount of lactobionic acid, lactobionic acid salt and/or lactobionic acid derivative in the coating layer amounts to at least 60% by weight, in particular at least 75% by weight.

The above-mentioned particles according to the invention are stabilized surprisingly satisfactorily by the coating layer containing the lactobionic acid, lactobionic acid salt and/or lactobionic acid derivative (hereinafter called LBA coating layer). This result according to the invention is all the more surprising as this is a coating layer which contains an essential proportion of an organic coating material without any problems arising with respect to the resistance to oxidation of this organic coating material. By way of the LBA coating layer according to the invention, the alkali metal peroxy salt particle is protected highly advantageously both against moisture acting from outside onto the alkali metal peroxy salt particle (for example from detergent components) and against the water originating from inside the alkali metal peroxy salt particle itself. A particular advantage of the invention also consists in that any freely mobile water present in the alkali metal peroxy salt can be easily trapped during storage by the LBA coating layer according to the invention; consequently, the decomposition of hydrogen peroxide from the peroxy salt which otherwise takes place with loss of active oxygen and formation of water and which negatively affects the quality of the product, is effectively prevented.

Another surprising advantage consists in that the water solubility and the rate of dissolution of the alkali metal peroxy salts are not reduced by the coating according to the invention. The coated alkali metal peroxy salt particles according to the invention consequently have advantageous application properties which are not always achieved in this way when moisture-repellent coating materials according to the state of the art are used.

The advantages of the invention are particularly apparent when the coating layer contains the lactobionic acid and/or the lactobionic acid salt in combination, preferably in mixture, with boric acid and/or a boric acid salt as further coating material. An appropriate embodiment of this variation of the invention features a coating layer in which the molar ratio of lactobionic acid and/or the lactobionic acid salt, on the one hand, to boric acid and/or the boric acid salt, on the other hand, is 10:1 to 1:3, preferably 6:1 to 1:1.5, based on boron; in particular, the molar ratio is approximately 1:1, i.e. 1.1:1 to 1:1.1. Those coated, particulate alkali metal peroxy salts are particularly advantageous in this connection, in which the combination, preferably, the mixture of the lactobionic acid and/or lactobionic acid salt coating material and the further coating material boric acid and/or boric acid salt amounts at least 80% by weight, preferably to at least 90% by weight of the coating material. In the case of the above combination of coating material of lactobionic acid and/or lactobionic acid salt on the one hand and/or boric acid and/or boric acid salt on the other hand, the coating materials from the two groups can, for example, be present in different coating layers; the PCS may, for example, be provided with an inner coating layer of coating material containing boric acid and/or boric acid salt which is followed by a second, outer coating with lactobionic acid and/or lactobionic acid salt. Preferably, however, the coating materials from the two above-mentioned groups are present jointly in combined form in one coating layer, according to this variation of the invention.

Both orthoboric ($H_3BO_3$) and metaboric acid ($HBO_2$) can be used as boric acid. Suitable boric acid salts are the inorganic borates which are derived, in terms of the formula, from ortho- or metaboric acid or are attributable to the polyboric acids with a lower water content having the general formula $H_{n-2}B_nO_{2n-1}$. In particular, the boron salts used according to the invention consist of boron minerals such as ortho- and metaborate, preferably of alkali borates; borax, for example, such as the penta- or decahydrate form is appropriate. On the other hand, partial and complete salt formation can be effected in a simple manner both with lactobionic acid and with the boric acids during the preparation of coating agent solutions by the addition of hydroxides or oxides of alkali or alkaline earth metals to aqueous solutions of lactobionic acid and/or boric acids.

According to a further variation of the invention, the advantages of the invention are achieved as well, if the coating layer contains the lactobionic acid, the lactobionic acid salt and/or the lactobionic acid derivative in combination, preferably in mixture, with an inorganic mineral salt mixture of alkali metal sulphate and alkali metal chloride as a further coating material.

In preferred particulate alkali metal peroxy salts coated according to the invention, the alkali metal or the sulphate or chloride in the coating material is sodium or potassium; according to this embodiment of the invention, the coating layer consequently contains, apart from lactobionic acid, lactobionic acid salt and/or lactobionic acid derivatives, a mineral salt mixture as further component, which mixture is formed by the co-crystallization of sodium or potassium sulphate on the one hand with sodium or potassium chloride on the other hand during the coating process. Particularly preferably, lactobionic acid salts, particularly sodium lactobionate, are combined with the alkali metal sulphate chloride.

The above mentioned particles according to the invention are stabilized surprisingly satisfactorily by the combined coating layer containing, on the one hand, the lactobionic acid, lactobionic acid salt and/or lactobionic acid derivative and the alkali metal sulphate/alkali metal chloride mineral salt mixture (hereinafter called LBA/sulphate chloride coating layer).

A particular advantage of the invention as regards the storability and storage stability of the coated alkali peroxy salts consequently consists in that the freely mobile water still present in the alkali metal peroxy salt can be easily trapped by the LBA/sulphate chloride coating layer according to the invention. Consequently, the decomposition of hydrogen peroxide in the peroxy salt, which otherwise takes place with loss of active oxygen and formation of water and which negatively affects the quality of the product, is effectively prevented. The stabilizing effect of the LBA fraction in the coating layer in thus effectively enhanced by the fraction of alkali metal sulphate chloride.

This result according to the invention is moreover surprising since alkali metal sulphate chloride is a coating layer component consisting of simple inorganic alkali metal salts whose individual components as such, i.e. the alkali metal sulphate or the alkali metal chloride, do not have such a stabilizing effect. Without laying down any specific theory or effecting any limiting elucidation of the invention, a possible explanation of the stabilizing effect of the coating layer component of alkali metal sulphate chloride according to the invention is that the alkali metal sulphate chloride is basically capable of forming clathrate. Both moisture acting from outside on to the alkali metal peroxy salt particles (e.g. from the detergent components) and water of crystallization formed inside the alkali metal peroxy salt particle itself as well as hydrogen peroxide are very firmly bound by the alkali metal sulphate chloride by incorporation into the crystal lattice positions of the clathrate while the later formed, the binding effect being in particular stronger than with normal water of crystallization. A particular advantage of clathrate formation consists in that the hydrogen peroxide partially liberated from the alkali metal peroxy salt during storage can be satisfactorily trapped and firmly bound by the alkali metal sulphate chloride coating layer according to the invention. Consequently, the decomposition of hydrogen peroxide from the peroxy salt which otherwise occurs with loss of active oxygen and formation of water and reduction of product quality can be effectively prevented by the combination of the LBA/sulphate chloride coating according to the invention.

The ratio of alkali metal sulphate to alkali metal chloride in the coating material may vary within a wide molecular range; however, molar ratios of alkali metal sulphate to alkali metal chloride of approximately 1:1 to approximately 8:1 are appropriate since it is assumed that, in this range, optimum ratios for clathrate formation are present. Molar ratios of alkali metal sulphate to alkali metal chloride of approximately 3:1 to approximately 5:1 are preferred.

According to an appropriate embodiment of the invention, the weight ratio of, on the one hand, lactobionic acid, the lactobionic acid salt and/or the lactobionic acid derivative to, on the other hand, the mineral salt mixture consisting of alkali metal sulphate and alkali metal chloride is 1:1 to 10:1, preferably 1.5:1 to 5:1;. in particular, the weight ratio is approximately 3:1 to 4:1. Those coated, particulate alkali metal peroxy salts are particularly advantageous in this connection, in which the proportion of the combination, preferably the mixture, of the coating material lactobionic acid, lactobionic acid salt and/or lactobionic acid derivative and the further coating material alkali metal sulphate/alkali metal chloride mineral salt mixture amounts to at least 80% by weight, preferably at least 90% by weight in total, based on the total quantity of the coating material. In the case of the above combination of coating materials of, on the one hand, lactobionic acid, lactobionic acid salt and/or lactobionic acid derivative with, on the other hand, alkali metal sulphate/alkali metal chloride mineral salt mixture, the coating materials of the two named groups may be present in different coating layers; for example, it is possible for PCS used as the alkali metal peroxy salt to be provided first with an inner coating layer of alkali metal sulphate/alkali metal chloride mineral salt mixture which is followed by a second outer layer of lactobionic acid, lactobionic acid salt and/or lactobionic acid derivative. Preferably, however, the coating materials from the two above-mentioned groups are present jointly in mixture in a (approximately homogeneous) coating layer.

Optionally, the coating material, apart from containing the coating materials according to the invention as described above, may also contain a small amount of other commonly used coating materials and/or other auxiliary agents commonly used during the preparation of alkali metal peroxy salts, in particular the preparation of sodium percarbonate. The proportion of such auxiliary substances should be maximum up to 20% by weight, based on the total coating material (in the case of several layers, based on all layers). This means, it may amount to 0 to 20% by weight of the coating material. The auxiliary materials which are commonly used in sodium percarbonate manufacture and which may be present in the coating material according to the invention include, for example, sodium polyphosphates, in particular sodium hexametaphosphate which may be present in amounts of 0 to 10% by weight based on the coating material; sodium polycarboxylates, in particular the sodium salts of acrylic acid polymers such as acrylic acid homopolymers or acrylic acid/maleic acid copolymers with a molecular weight in the range of 2,500 to 100,000, in particular sodium polyacrylate which may be present in quantities of 0 to 10% by weight based on the coating material; sodium bilicates, preferably waterglass with a ratio of $SiO_2:Na_2O$ of 3.5:1 to 2:1, which may be present in an amount of 0 to 20% by weight based on the coating material; phosphonic acids, in particular hydroxy-substituted lower alkane mono- or diphosphonic acids such as 1-hydroxyethane-1,1-diphosphonic acid, or the salts thereof which may be present in quantities of 0 to 5% by weight, based on the coating material; and water-soluble magnesium salts, in particular magnesium sulphate which may be present in quantities of 0 to 10% by weight, based on the coating material. Apart from the above-mentioned auxiliary agents, all the auxiliary agents which are known to be suitable for use in the preparation of alkali metal peroxy salts, and sodium percarbonate in particular, can be present in the coating material.

The minimum quantity of the coating material as a whole which is present in the particulate alkali metal peroxy salts coated according to the invention corresponds essentially to the quantity which is necessary for a largely complete coating of the particles. Using a coating layer of at least 1% by weight, in particular at least 2% by weight—depending on the surface properties of the alkali metal peroxy salt particles—it is possible to achieve a coating suitable for stabilizing the particles. The upper limit as regards the amount of solid coating material is essentially determined by the aim that the active oxygen content in the particles to be stabilized ought not to be unnecessarily reduced by excess coating material. For this reason, the quantity of solid coating material, based on the weight of the coated particles of alkali metal peroxy salt should preferably not exceed 5 to 6% by weight; quantities of more than 10% by weight have consequently not been found to be particularly appropriate. As a rule, the amount of solid coating material is therefore preferably 2 to 10% by weight, in particular 3 to 6% by weight, based on the coated particles of alkali metal peroxy salt. Within this range, a complete and optimum coating of the alkali metal peroxy salt is, in any case, guaranteed.

Although it is possible according to the invention to stabilize any desired alkali metal peroxy salts by coating with the LBA coating layer with the particles of the peroxy compounds to be stabilized containing a single peroxy salt or a mixture of peroxy salts, the invention is aimed particularly advantageously at the stabilization of sodium peroxycarbonate (sodium percarbonate). The peroxy salts to be coated may contain small quantities of different conventional additives used in the manufacture of these peroxy salts, which generally do not exceed 10% by weight of the peroxy salt material. Additives of this type are e.g. stabilizers such as, in particular, alkali metal or magnesium silicates, magnesium sulphate, phosphates (e.g. metaphosphate), organic stabilizers such as quinolinic acid, salicylic acid or dipicolinic acid (DPA), chelating agents such as 8-oxyquinoline or ethylene diamine tetraacetic acid (EDTA), phosphonic acid derivatives such as methylene or aminomethylene phosphonic acids or the salts thereof, in particular 1-hydroxyethylidene diphosphonic acid (HEDP) and small quantities of the usual wetting agents.

The peroxy compound on which the particulate alkali metal peroxy salt coated according to the invention, in particular the coated percarbonate, is based can have been prepared according to any process known according to the state of the art. Such processes for the preparation of alkali metal peroxy salts comprise in particular the so-called wet and dry processes and are sufficiently well known to the expert. The alkali metal peroxy salts to be coated according to the invention can be subjected to a granulation step before the coating layer is applied, in order to increase their particle size. Suitable granulating processes are e.g. both compacting methods (dry granulation) and agglomeration granulation processes (moist granulation) possibly with the use of a common binder or granulating aid. However, large and heavy particles can be obtained directly by dry production methods. After coating according to the invention, the heavy particles obtained are highly suitable for use in compact detergents and bleaching agents.

Accordingly, the coated particulate alkali metal peroxy salts according to the invention can be used in general in detergents or bleaching agents, in particular in compact detergents and compact bleaching agents.

The invention also relates to a process for the production of the particulate alkali metal peroxy salts stabilized according to the invention by coating, by coating them with a solid coating layer whose coating material contains an essential proportion of lactobionic acid, a lactobionic acid salt and/or a lactobionic acid derivative. This process for the production of coated particulate alkali metal peroxy salts according to the invention is carried out in such a way that the particles of the peroxy salts are treated with an aqueous coating agent containing the dissolved or suspended components of the coating material and the water is evaporated in order to dry the treated particles. In the case of this method, a coating layer is produced on the surface of the alkali metal peroxy salt particles which coating layer contains lactobionic acid, lactobionic acid salts and/or a lactobionic acid derivative as coating materials and, optionally, conventional auxiliary agents for the production of alkali metal peroxy salt.

The concentration in which various components of the coating material are present in the coating agent is most appropriately selected in such a way that a solids content is present in the aqueous coating agent (content of dissolved and/or suspended coating materials and other conventional auxiliary agents in the coating agent) sufficient for the desired degree of coating and that the moisture content of the alkali metal peroxy salt treated with the aqueous coating agent does not rise excessively so that, after applying the coating agent, as little water as possible needs to be evaporated during subsequent drying. Most appropriately, the solids content of the aqueous coating agent is consequently at least 25% by weight, preferably at lest 40% by weight. In particular, coating agents with solids contents of 40 to 60% by weight are used in the process according to the invention. Depending on the coating materials used, the pH-values of these coating agents may vary within a wide range, from acidic to alkaline, e.g. from a pH-value of around 1.5 to approximately 12. If acids are used as coating material (e.g. lactobionic acid or optionally boric acid) the pH-values can also be adjusted to the desired value by adding alkali and/or alkaline earth metal hydroxides or oxides (in particular with NaOH or another alkali metal base). The moisture content of the alkali metal peroxy salt treated with the aqueous coating agent should not be too high; otherwise, drying of the product may be unnecessarily difficult. Consequently, the moisture content of the treated product before drying should generally be below 9% by weight and preferably 2.5 to 6% by weight.

The temperature at which the particles are treated with the coating agent and the evaporation of the water is carried out is selected as a function of the type of peroxy compound to be treated. The treatment of the alkali metal peroxy salt particles with the coating agent is generally carried out at a temperature which is slightly below to slightly above the temperature of the particles to be coated. When the coating agent is applied, the particles of the peroxy compound are appropriately maintained at a temperature below the decomposition temperature of the peroxy compound and in general below 90° C. During evaporation of the water to dry the particles, the temperature is generally between 30° and 80° C.

During drying of the alkali metal peroxy salts treated with the coating agent, the water should be removed to as low a residual water content as possible, e.g. in any case to a residual water content of less than 2% by weight. Preferably, drying to a residual water content of less than 1% by weight, in particular of less than 0.6% by weight is carried out.

The application of the coating layer onto the alkali metal peroxy salt particles can take place both by the batch-wise and the continuous method. In the case of the batch-wise method, the peroxy salt particles can, for example, be treated in a suitable mixer, e.g. a ploughshare mixer and subsequently passed to the drying stage (e.g. a fluid bed). It is also possible for the peroxy salt particles to be sprayed with the solution of the coating material components in a fluid bed; in this case, the water can be evaporated simultaneously in the fluid bed and dry coated particles obtained in one step.

The fluid bed process is carried out in a manner known as such and can also be continuous. According to a further variation of the process for the production of the alkali metal peroxy salts coated according to the invention, the coating material and, optionally, the additional auxiliary agents commonly used can be applied onto the particulate alkali metal peroxy salt in a ring layer mixer. In such a ring layer mixer, the particles to be coated are mixed intensively with the aqueous coating agent at a rate of rotation in particular of 1500 to 1800 rpm (revolutions per minute) within a ring layer on the wall of the ring layer mixer. The product produced in the ring layer mixer which is still damp is subsequently dried in the conventional manner, in a fluid bed dryer. The production process using the ring layer mixer is an effective method and provides advantageous products, especially products with a particularly homogeneous coating.

If alkali metal peroxy salt particles coating according to the invention are to be produced, whose coating layer contains a combination of lactobionic acid and/or lactobionic acid salt with boric acid and/or boric acid salt as further coating material, this combination of coating materials can be applied as a mixture in one step, while a uniform coating layer of lactobionic acid/lactobionic acid salt and boric acid/boric acid salt formed. If desired, the combination of the above coating materials can also be applied separately in several stages, by component, to give a multi-layer coating layer with an onion peel type structure. It is, for example, possible according to this latter variation to apply initially a first inner coating layer containing boric acid and/or boric acid salt and subsequently an outer coating layer containing lactobionic acid and/or lactobionic acid salt.

In an analogous manner, in one step or optionally separately in several steps it is done, if coated alkali metal peroxy salts are manufactured according to the invention, of which the coating layers contain a Combination of lactobionic acid, lactobionic acid salt and/or lactobionic acid derivative with a mineral salt mixture as a further coating material consisting of alkali metal sulphate and alkali metal chloride.

The coated alkali metal peroxy salt particles according to the invention exhibit a favorable combination of different advantages. In this way, advantageously coated particles of peroxy compounds are made available according to the invention, which particles are satisfactorily stabilized both against the moisture resulting from the base components of detergents and against the residual moisture content present in these alkali metal peroxy salt particles. In addition, the coating layer according to the invention also effectively binds the hydrogen peroxide which may be split off from these compounds, particularly in the case of percarbonate, during storage; as a result of this liberated hydrogen peroxide being fixed, it can no longer decompose to form water with loss of active oxygen. The alkali metal peroxy salts coated according to the invention, particularly percarbonate, exhibit an excellent stability even in the presence of the usual detergent components such as, for example, zeolites, linear alkyl sulphonates, soaps, carboxymethylcellulose, soda, optical brighteners etc. The water-solubility and rate of dissolution of the alkali metal peroxy salt particles coated according to the invention will not be reduced by the coating according to the invention; satisfactory application properties are thus guaranteed.

The invention makes it possible to produce stable alkali metal peroxy salt particles, in particular percarbonate particles, with an LBA coating layer. Surprisingly enough, the builder and co-builder properties of the lactobionic acid, the lactobionic acid salt and/or the surfactant properties of the lactobionic acid derivatives are retained in this process. Thus, neither the satisfactory dispersion capacity nor the excellent chelating capacity of lactobionic acid and/or the lactobionic acid salts is in any way reduced by their use as coating material for coating alkali metal peroxy salts. If the lactobionic acid and/or a lactobionic acid salt is used in mixture with boric acid or a boric acid salt (borate) as coating material for coating the alkali metal peroxy salts, it is possible to utilize to advantage not only the resulting stabilization of the alkali metal peroxy salt (in particular percarbonate) but also the suitability of this special coating material as a builder or co-builder. Consequently, the coating material according to the invention can —in addition to the coating function—also provide a builder function in the ready-to-use composition. It is thus possible to reduce the proportion of other builders or co-builders contained in this composition by the proportion of the coating material according to the invention introduced together with the coated alkali metal peroxy salt.

The following examples provide a further explanation of the invention. rpm stands for revolutions per minute; min stands for minute; RT stands for room or ambient temperature; % represents percent by weight; LBA=lactobionic acid; CaLBA=calcium lactobionate; KLBA=potassium lactobionate; NaLBA=sodium lactobionate; LA=lactobionic acid coconut amide; h=hour; vac.=vacuum; NaOH=sodium hydroxide; $H_3BO_3$=boric acid; Avox.=active oxygen content; LKB=heat flow measurements.

EXAMPLE 1

For the preparation of sample quantities of PCS particles coated according to the invention, the following process was used:

A weighed quantity (2 to 3 kg, preferably 2.5 kg) of sodium percarbonate was introduced into a Loedige mixer and the mixer shaft was adjusted to a rate of rotation of approximately 200 rpm. The quantity (c) of coating agent (coating agent=coating materials dissolved in water) which had been calculated for the degree of coating concerned (b), was metered homogeneously into the mixer via a dropping funnel in the course of 1 minute. After adding the coating agent, additional mixing was carried out for approximately 1 minute. Subsequently, the moist product was removed from the mixer and dried batch-wise (approximately 2 kg) in a smooth fluid bed dried at an input air temperature of 95° to 120° C. and a discharge air temperature of up to 70° C. The quantity of input air was controlled in such a way that a slightly reduced pressure was present in the drier and complete turbulence was achieved in the product at the same time. As soon as a discharge air temperature of 70° C. had been reached, the product was removed from the drier and cooled in the air to room temperature.

Calculation of the degree of coating (b), quantity of coating agent required (c) and moisture content (d) after the addition of the coating agent and quantity of the coating material to be applied (=solid, a):

$$b[\%] = \frac{a[g] * 100}{e[g]} \qquad c[g] = \frac{a[g] * 100}{g[\%]}$$

$$d[\%] = \frac{c[g] * (100 - g[\%])}{c[g] + f[g]} \qquad a[g] = \frac{b[\%] * 1000}{100 - b[\%]}$$

where:
- a=coating layer=solid to be applied [g]
- b=degree of coating [%]=percentage of coating layer (total content of substance) in the end product
- c=coating agent to be applied [g](=coating solution)
- d=moisture content [%]=percentage of water in the product after addition of the coating solution
- e=coated sodium percarbonate [g]=PCS+coating layer
- f=sodium percarbonate, starting product [g]
- g=solids content [%] of the coating solution.

The average grain diameter of the PCS used (with the exception of experiment nos. 15 and 16) was 500 to 600 µm; in experiment nos. 15 and 16, the average grain diameter of the starting PCS was 600 to 700 µm. Individual conditions of the tests carried out are contained in Table I (Experiment nos. 1 to 16).

According to the above method, coated PCS particles with the properties indicated in Table II were obtained (Experiment nos. 1 to 16).

EXAMPLE 2

In line with the method used in example 1, a coating of two layers of sodium percarbonate (PCS) was applied by a two-stage method. For this purpose, a coating solution of borax pentahydrate (quantity based on boron: 41 g/kg based on boron) and waterglass (quantity converted on the basis of $Na_2O$ or $SiO_2$:121 g/kg $Na_2O$ and 53 g/kg $SiO_2$) was first applied in an initial stage according to example 1 onto PCS and coated; concentration of the coating solution [%]=44.3; moisture content d [%]=1.6. In a second stage, PCS coated as detailed above was subsequently coated with a further coating solution of 475 g/kg LBA and 49 g/kg NaOH; concentration of the coating solution [%]=51.3; pH=10.1; moisture content d [%]=3.7. The degree of coating after the first stage was 1.3% and after the second stage 1.3%+4%= 5.3% (total degree of coating). The average grain diameter of the initial PCS was 500 to 600 µm. The properties of the coated PCS particles obtained according to this example are also indicated in Table II.

EXAMPLE 3

For the preparation of sample quantities of PCS particles coated according to the invention, a weighed quantity of 2 to 2.5 kg of sodium percarbonate was introduced into a Loedige mixer and treated in line with example 1. The calculation of coating level (b), quantity of coating agent (c) required and of the moisture level (d) after addition of the coating agent, as well as the quantity of coating material (=solid material, a) to be applied was also done as indicated in example 1. A clear aqueous solution was used as the coating solution which consisted of 296 g sodium lactobionate, 89 g sodium sulphate ($Na_2SO_4$), 9 g sodium chloride (NaCl) per 1000 g solution, the remainder being water (test no. 17). The experiment with the before given coating solution was repeated (no. 18). In a further experiment (no. 19), the coating solution (based on 1,000 g solution) consisted of 200 g sodium lactobionate, 181 g sodium sulphate, 19 g sodium chloride, the remainder being water.

The average grain diameter of the PCS used was approximately 650 µm. Individual conditions of the tests carried out are shown in Table I (test nos. 17 to 19).

According to the above method, coated PCS particles with the properties indicated in Table III (test nos. 17 to 19) were obtained.

EXAMPLE 4

Heat flow measurements (LKB measurements) were carried out on the sodium percarbonate products coated according to the invention and prepared in the above example, in order to assess the storage life and the stability properties. In the case of these heat flow measurements, the heat flows which arise under isothermic conditions of measurement provide an indication of the stability of the product containing active oxygen. In particular, the stability of the product in the presence of detergent components can be determined if the heat flow measurements are carried out on samples in which the active oxygen-containing product is present in mixture with the detergent components. For the heat flow measurements carried out in this case, the fresh PCS products coated according to the invention (either immediately or 1 or 2 days after production) or PCS products aged over several days were introduced into a detergent base in such an amount that the active oxygen content amounted to 2%; the ageing time corresponds approximately to those periods over which the PCS is commonly stored and/or transported (e.g. a few days up to 2 weeks as a rule), until it is incorporated into the detergent formulation by the detergent manufacturer. The detergent base used consisted of a standard detergent free from active oxygen and based on zeolite, which contained as components in the usual quantities, zeolite, linear alkyl sulphonates (LAS), soap, carboxymethylcellulose (CMC), soda and optical brighteners. The heat flow measurements on these samples were carried out in an LKB 2277 bioactivity monitor at 40° C. over a period of 20 hours. The obtained readings found for sodium percarbonate particles coated according to the invention are shown in the Tables II and III.

For comparison with the samples according to the invention, heat flow measurements were carried out in the same way on sodium percarbonate products according to the art which had been coated with sodium carbonate or sodium carbonate/sodium sulphate (molar ratio 2.5:1; degree of coating: 2.5 and 3% by weight). The heat flow values in each case in µW/g are indicated in Table IV.

The lower the heat flow determined, the higher is the stability of the active oxygen-containing product in the detergent base and the more advantageous is the coating of the coated PCS particles.

EXAMPLE 5

To determine the chemical stability of the coated sodium percarbonate, the loss of active oxygen (Avox stability) was determined. For this purpose, the product was heated for 2 hours to 105° C. and the loss of active caused by decomposition was determined. The determination of the active oxygen content was carried out using the usual titrimetric methods. The values obtained are indicated in Tables II and III.

TABLE I

Coating conditions, Examples 1 and 3.

| No. | Coating Solution (g/kg) | Degree of Coating (b) (%) | Solids Content (g) of coating solution (%) | pH-value | Moisture Content (d) (%) |
|---|---|---|---|---|---|
| 1 | 250 LBA | 2 | 25 | 2.1 | 5.7 |
| 2 | 250 LBA | 3 | 25 | 2.1 | 8.3 |
| 3 | 500 LBA | 4 | 50 | 1.6 | 3.9 |
| 4 | 475 LBA 49 NaOH | 4 | 51.3 | 10.1 | 3.6 |
| 5 | 458 LBA 83 $H_3BO_3$ | 3.7 | 54 | — | 3.1 |
| 6 | 419 LBA 73 $H_3BO_3$ 84 NaOH | 3.8 | 58 | 7.0 | 2.7 |
| 7 | 350 CaLBA 50 LA | 4 | 40 | 4.9 | 5.7 |
| 8 | 350 KLBA 50 LA | 4 | 40 | 5.9 | 5.7 |
| 9 | 475 LBA 49 NaOH | 4 | 51.3 | 10.1 | 3.6 |
| 10 | 425 NaLBA | 4 | 42.5 | 7.6 | 5.1 |
| 11 | 415 LBA 0.4 LA 75.8 $H_3BO_3$ 93.4 NaOH | 4 | 56.4 | 10.4 | 3.0 |
| 12 | 383 NaLBA 59.3 $H_3BO_3$ 40 NaOH | 4 | 47.4 | 11.1 | 4.3 |
| 13 | 364 KLBA 55 $H_3BO_3$ 36 NaOH | 4 | 44.7 | 11.6 | 4.7 |
| 14 | 363 CaLBA | 4 | 45.3 | 10.6 | 4.6 |
| 15 | 425 NaLBA | 4 | 42.5 | 7.6 | 5.1 |
| 16 | 383 NaLBA 59.3 $H_3BO_3$ 40.4 NaOH | 4 | 47.4 | 11.1 | 4.3 |
| 17 | 296 NaLBA 89 $Na_2SO_4$ 9 NaCl | 5 | 39.4 | 6.9 | 7.1 |
| 18 | 296 NaLBA 89 $Na_2SO_4$ 9 NaCl | 5 | 39.4 | 6.9 | 7.1 |
| 19 | 200 NaLBA 181 $Na_2SO_4$ 19 NaCl | 5 | 40 | 6.9 | 7.1 |

TABLE II

Properties of PCS coated according to the invention according to Example 1 and Example 2.

| Example 1 No. | Active Oxygen (%) | LKB Value in a Detergent Base (µW/g) [Example 3] | Stability 2 h/105° C. (%) [Example 4] | Grain Diameter (µm) | Rate of Dissolution (%) after | Residual Moisture Content 2 h/40° C./ vac. (%) |
|---|---|---|---|---|---|---|
| 1 | 13.8 | 17 (1 day) 22 (7 days) | 14 | 630 | 1 min 86 / 2 min 98 / 3 min 100 | 0.25 |
| 2 | 13.7 | 14 (1 day) 16 (7 days) | 15 | 650 | 1 min 86 / 2 min 98 / 3 min 100 | 0.25 |
| 3 | 13.5 | 10 (2 days) 14 (7 days) | 13 | 650 | 1 min 82 / 2 min 98 / 3 min 100 | 0.40 |
| 4 | 13.4 | 4 (2 days) 10 (6 days) 9 (29 days) | 14 | 680 | 1 min 83 / 2 min 97 / 3 min 100 | 0.37 |
| 5 | 13.6 | 14 (1 day) | 14 | 680 | 1 min 86 / 2 min 98 / 3 min 100 | 0.52 |
| 6 | 13.4 | 15 (1 day) | 15 | 660 | 1 min 82 / 2 min 97 / 3 min 100 | 0.72 / 0.76 |
| 7 | 13.6 | 8 (1 day) 14 (16 days) | — | 710 | 1 min 73 / 2 min 91 / 3 min 98 | 0.28 |
| 8 | 13.6 | 16 (1 day) | — | 700 | 1 min 73 / 2 min 94 / 3 min 99 | 0.38 |
| 9 | 13.4 | 8.5 (1 day) 11 (12 days) | 14 | 650 | 1 min 83 / 2 min 96 / 3 min 100 | 0.35 |
| 10 | 13.4 | 18 (2 days) | 15 | 630 | 1 min 81 / 2 min 97 / 3 min 100 | 0.27 |
| 11 | 13.5 | 20 (1 day) | 16 | 650 | 1 min 88 / 2 min 99 / 3 min 100 | 0.46 |

TABLE II-continued

Properties of PCS coated according to the invention according to Example 1 and Example 2.

| Example 1 No. | Active Oxygen (%) | LKB Value in a Detergent Base (µW/g) [Example 3] | Stability 2 h/105° C. (%) [Example 4] | Grain Diameter (µm) | Rate of Dissolution (%) after | | Residual Moisture Content 2 h/40° C./ vac. (%) |
|---|---|---|---|---|---|---|---|
| 12 | 13.5 | 29 (1 day) | 18 | 660 | 1 min | 88 | 0.57 |
|  |  |  |  |  | 2 min | 98 |  |
|  |  |  |  |  | 3 min | 100 |  |
| 13 | 13.5 | 18 (1 day) | — | 640 | 1 min | 88 | 0.53 |
|  |  |  |  |  | 2 min | 99 |  |
|  |  |  |  |  | 3 min | 100 |  |
| 14 | 13.6 | 17 (2 days) | 17 | 610 | 1 min | 81 | 0.34 |
|  |  |  |  |  | 2 min | 97 |  |
|  |  |  |  |  | 3 min | 100 |  |
| 15 | 13.6 | 16 (1 day) | 9 | 790 | 1 min | 66 | 0.35 |
|  |  | 19 (4 days) |  |  | 2 min | 89 |  |
|  |  |  |  |  | 3 min | 98 |  |
| 16 | 13.6 | 16 (1 day) | 11 | 680 | 1 min | 69 | 0.63 |
|  |  | 16 (4 days) |  |  | 2 min | 92 |  |
|  |  |  |  |  | 3 min | 97 |  |
| Ex. 2 | 13.3 | 9 (1 day) | 18 | 680 | 1 min | 80 | 0.71 |
|  |  | 10 (12 days) |  |  | 2 min | 92 |  |
|  |  |  |  |  | 3 min | 100 |  |

TABLE III

Properties of PCS coated according to the invention according to Example 3.

| Example 3 No. | Active oxygen (%) | LKB value in a detergent base (µW/g) [Example 4] | Stability 2 h/105° C. (%) [Example 5] | Grain Diameter (µm) | Rate of Dissolution (%) after | | Residual Moisture Content 2 h/40° C./ vac. (%) |
|---|---|---|---|---|---|---|---|
| 1 | 13.4 | 7 (0 day) | 10 | 740 | 1 min | 80 | 0.35 |
|  |  |  |  |  | 2 min | 95 |  |
|  |  |  |  |  | 3 min | 100 |  |
| 2 | 13.4 | 7 (3 days) | 11 | 690 | 1 min | 78 | 0.35 |
|  |  |  |  |  | 2 min | 96 |  |
|  |  |  |  |  | 3 min | 100 |  |
| 3 | 13.5 | 9 (0 day) | 9 | 720 | 1 min | 81 | 0.35 |
|  |  |  |  |  | 2 min | 97 |  |
|  |  |  |  |  | 3 min | 100 |  |

TABLE IV

Reference Examples
(according to the state of the art, fresh product (1 to 2 days).

| No. | Active Oxygen (%) | LKB Value in Detergent Base (µW/g) [Example 4] | Coating |
|---|---|---|---|
| V 1 | 13.3 | 54 | $Na_2CO_3$ degree of coating 6% by weight |
| V 2 | 13.7 | 25–56 | $Na_2CO_3/Na_2SO_4$ (2.5:1) degree of coating 2.5% by weight |
| V 3 | 13.6 | 42–55 | $Na_2CO_3/Na_2SO_4$ (2.5:1) degree of coating 3% by weight |

We claim:

1. A coated particulate alkali metal peroxy salt comprising a core comprising at least one alkali metal peroxy salt selected from the group consisting of peroxycarbonates, peroxypyrophosphate, peroxytripolyphosphate and peroxymonosulphate, said at least one peroxy salt being surrounded by a coating layer comprising at least one substance selected from the group consisting of lactobionic acid, lactobionic acid salts and lactobionic acid derivatives.

2. A coated particulate alkali metal peroxy salt according to claim 1, wherein said coating further comprises at least one conventional auxiliary agent used in the manufacture of alkali metal peroxy salts, said at least one auxiliary agent being selected from the group consisting of sodium polyphosphates, sodium polycarboxylates, sodium silicates, phosphonic acids and the salts thereof, and magnesium sulphate.

3. A coated particulate alkali metal peroxy salt according to claim 1, wherein said coating layer comprises at least 50% by weight of at least one substance selected from the group consisting of lactobionic acid, lactobionic acid salts and lactobionic acid derivatives.

4. A coated particulate alkali metal peroxy salt according to claim 1, wherein said coating layer further comprises boric acid, a boric acid salt or a mixture thereof.

5. A coated particulate alkali metal peroxy salt according to claim 4, wherein the coating layer comprises lactobionic acid, a lactobionic acid salt or a mixture thereof admixed with boric acid, a boric acid salt or a mixture thereof.

6. A coated particulate alkali metal peroxy salt according to claim 5, wherein said coating layer comprises a molar ratio of lactobionic acid, lactobionic acid salt or mixture thereof to boric acid, boric acid salt or mixture thereof of 10:1 to 1:3, based on boron.

7. A coated particulate alkali metal peroxy salt according to claim 5, wherein the lactobionic acid, lactobionic acid salt or mixture thereof and the boric acid, boric acid salt or mixture thereof together comprise at least 80% by weight of the coating layer.

8. A coated particulate alkali metal peroxy salt according to claim 7, wherein the lactobionic acid, lactobionic acid salt or mixture thereof and the boric acid, boric acid salt or mixture thereof together comprise at least 90% by weight of the coating layer.

9. A coated particulate alkali metal peroxy salt according to claim 1, wherein said coating layer further comprises an inorganic mineral salt mixture of alkali metal sulphate and alkali metal chloride.

10. A coated particulate alkali metal peroxy salt according to claim 9, wherein the coating layer comprises a weight ratio of said at least one substance selected from the group consisting of lactobionic acid, lactobionic acid salts and lactobionic acid derivatives to mineral salt mixture of alkali metal sulfate and alkali metal chloride of 1:1 to 10:3.

11. A coated particulate alkali metal peroxy salt according to claim 9, wherein the mineral salt mixture comprises a molar ratio of alkali metal sulphate to alkali metal chloride of 1:1 to 8:1.

12. A coated particulate alkali metal peroxy salt according to claim 9, wherein said at least one substance selected from the group consisting of lactobionic acid, lactobionic acid salts and lactobionic acid derivatives and the mineral salt mixture of alkali metal sulfate and alkali metal chloride together comprise at least 80% by weight of the coating layer.

13. A coated particulate alkali metal peroxy salt according to claim 1, wherein the coating layer comprises at least 1% by weight of the coated alkali metal peroxy salt particles.

14. A coated particulate alkali metal peroxy salt according to claim 13, wherein the coating layer comprises 3 to 6% by weight of the coated alkali metal peroxy salt particles.

15. A coated particulate alkali metal peroxy salt according to claim 1, wherein the alkali metal peroxy salt is sodium percarbonate.

16. A method of coating an alkali metal peroxy salt comprising applying to particles of said peroxy salt a coating material comprising at least one substance selected from the group consisting of lactobionic acid, lactobionic acid salts and lactobionic acid derivatives, said particles comprising at least one peroxy salt selected from the group consisting of peroxycarbonates, peroxypyrophosphate, peroxytripolyphosphate and peroxymonosulphate.

17. A method according to claim 16, wherein the peroxy salt particles comprise sodium percarbonate.

18. A method according to claim 16, wherein said coating material further comprises boric acid, a boric acid salt or a mixture thereof.

19. A method according to claim 16, wherein said coating material further comprises an inorganic mineral salt mixture of alkali metal sulphate and alkali metal chloride.

20. A method according to claim 16, wherein said applying step comprises treating alkali metal peroxy salt particles with an aqueous coating agent comprising at least one substance selected from the group consisting of lactobionic acid, lactobionic acid salts and lactobionic acid derivatives in the dissolved or suspended state, and thereafter drying the treated particles.

21. A method according to claim 20, wherein said aqueous coating agent further comprises at least one auxiliary agent conventionally used in the manufacture of alkali metal peroxy salt.

22. A method according to claim 20, wherein said aqueous coating agent has a solids content of at least 25% by weight.

23. A method according to claim 20, wherein the treated particles are dried to a residual water content of less than 2% by weight.

24. A detergent or bleaching composition comprising an effective bleaching amount of a coated particulate alkali metal peroxy salt and at least one conventional detergent or bleaching composition ingredient; said costed particulate alkali metal peroxy salt comprising a core comprising an alkali metal peroxy suit surrounded by a coating layer comprising at least one substance selected from the group consisting of lactobionic acid, lactobionic acid salts and lactobionic acid derivatives.

* * * * *